US010570669B2

(12) United States Patent
Richert et al.

(10) Patent No.: US 10,570,669 B2
(45) Date of Patent: Feb. 25, 2020

(54) EARTH-BORING TOOLS HAVING IMPREGNATED CUTTING STRUCTURES AND METHODS OF FORMING AND USING THE SAME (71) Applicant: Baker Hughes, a GE company, LLC, Houston, TX (US)

(72) Inventors: Volker Richert, Celle/Gross-Hehlen (DE); Nathaniel R. Adams, Spring, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 153 days.

(21) Appl. No.: 15/406,426

(22) Filed: Jan. 13, 2017

(65) Prior Publication Data

US 2018/0202236 A1   Jul. 19, 2018

(51) Int. Cl.
*E21B 10/62* (2006.01)
*E21B 3/00* (2006.01)
(Continued)

(52) U.S. Cl.
CPC ............... *E21B 10/62* (2013.01); *E21B 3/00* (2013.01); *E21B 10/48* (2013.01); *E21B 10/54* (2013.01)

(58) Field of Classification Search
CPC .......... E21B 10/46; E21B 10/62; E21B 10/54; E21B 10/48; E21B 10/602; E21B 10/60; E21B 10/605; E21B 10/55; E21B 10/43
See application file for complete search history.

(56) References Cited

U.S. PATENT DOCUMENTS 4,128,136 A * 12/1978 Generoux ............ B28D 1/041
                                                     175/379
4,884,477 A * 12/1989 Smith .................... B22F 7/06
                                                    76/108.2
(Continued)

FOREIGN PATENT DOCUMENTS

CA         2625521 A1    4/2007
WO      2008/086083 A2   7/2008
(Continued)

OTHER PUBLICATIONS

European Search Report and Search Opinion Received for EP Application No. 18150899.5, dated Jun. 7, 2018, 10 pages.
(Continued)

*Primary Examiner* — Brad Harcourt
*Assistant Examiner* — David Carroll
(74) *Attorney, Agent, or Firm* — TraskBritt (57) ABSTRACT A tool for drilling subterranean formations includes a tool body having a face surface, a blade extending radially outward on the face surface toward a gage surface, and a plurality of cutting structures disposed in the blade. Each of the plurality of cutting structures comprises a substantially spherical body of particulate impregnated matrix material. A method of forming the tool includes forming a tool body having the plurality of cutting structures dispersed therein. A method of using the tool includes rotating the earth-boring tool within a wellbore and engaging a formation material of an earth formation with an outer surface of the blade and wearing the outer surface of the blade to expose the spherical cutting structure. After wearing the outer surface of the blade, the method includes engaging the earth formation with the spherical cutting structure.

20 Claims, 3 Drawing Sheets

(51) Int. Cl.
*E21B 10/54* (2006.01)
*E21B 10/48* (2006.01)

(56) References Cited

U.S. PATENT DOCUMENTS

| | | | |
|---|---|---|---|
| 4,943,488 A | 7/1990 | Sung et al. | |
| 5,049,164 A | 9/1991 | Horton et al. | |
| 5,090,491 A * | 2/1992 | Tibbitts | E21B 10/46 |
| | | | 175/426 |
| 5,967,248 A * | 10/1999 | Drake | B22F 7/06 |
| | | | 175/374 |
| 6,009,962 A * | 1/2000 | Beaton | E21B 10/46 |
| | | | 175/426 |
| 6,510,906 B1 | 1/2003 | Richert et al. | |
| 6,843,333 B2 | 1/2005 | Richert et al. | |
| 7,278,499 B2 | 10/2007 | Richert et al. | |
| 7,497,280 B2 | 3/2009 | Brackin et al. | |
| 7,617,747 B2 | 11/2009 | Richert et al. | |
| 7,621,350 B2 | 11/2009 | Richert | |
| 7,730,976 B2 | 6/2010 | McClain et al. | |
| 7,810,588 B2 | 10/2010 | McClain et al. | |
| 8,191,657 B2 | 6/2012 | Richert et al. | |
| 8,220,567 B2 | 7/2012 | Scott et al. | |
| 8,225,890 B2 | 7/2012 | Scott | |
| 8,333,814 B2 | 12/2012 | Brackin et al. | |
| 8,408,338 B2 | 4/2013 | Richert | |
| 8,757,290 B2 | 6/2014 | Teodorescu et al. | |
| 8,911,522 B2 | 12/2014 | Cleboski et al. | |
| 9,243,458 B2 | 1/2016 | Bilen et al. | |
| 9,284,788 B2 | 3/2016 | Lockwood et al. | |
| 2006/0162967 A1 | 7/2006 | Brackin et al. | |
| 2007/0079992 A1 * | 4/2007 | Curry | C22C 29/08 |
| | | | 175/374 |
| 2008/0017421 A1 | 1/2008 | Lockwood | |
| 2008/0202821 A1 * | 8/2008 | McClain | C22C 1/101 |
| | | | 175/434 |
| 2010/0122848 A1 | 5/2010 | McClain | |
| 2010/0181116 A1 | 7/2010 | Stauffer | |
| 2010/0219000 A1 | 9/2010 | Doster | |
| 2011/0061943 A1 | 3/2011 | Richert | |
| 2012/0080240 A1 | 4/2012 | Green et al. | |

FOREIGN PATENT DOCUMENTS

| | | | |
|---|---|---|---|
| WO | WO-2008086083 A2 * | 7/2008 | B22F 7/062 |
| WO | 2013/180695 A1 | 12/2013 | |

OTHER PUBLICATIONS

European Communication pursuant to Article 94(3) EPC for European Application No. 18150899.5, dated Apr. 12, 2019, 6 pages.

* cited by examiner

EARTH-BORING TOOLS HAVING IMPREGNATED CUTTING STRUCTURES AND METHODS OF FORMING AND USING THE SAME

TECHNICAL FIELD

The present disclosure, in various embodiments, relates generally to impregnated cutting structures for earth-boring tools including, for example, drag bits and coring bits, methods of forming the earth-boring tools, and methods of using the earth-boring tools.

BACKGROUND

Wellbores are formed in subterranean formations for various purposes including, for example, the extraction of oil and gas from a subterranean formation and the extraction of geothermal heat from a subterranean formation. A wellbore may be formed in a subterranean formation using a drill bit, such as, for example, an earth-boring rotary drill bit. Different types of earth-boring rotary drill bits are known in the art, including, for example, fixed-cutter bits (which are often referred to in the art as "drag" bits), rolling-cutter bits (which are often referred to in the art as "rock" bits), impregnated bits (impregnated with diamonds or other superabrasive particles), and hybrid bits (which may include, for example, both fixed cutters and rolling cutters).

An earth-boring drill bit is typically mounted on the lower end of a drill string and is rotated by rotating the drill string at the surface or by actuation of downhole motors or turbines, or by both methods. The drill string comprises a series of elongated tubular segments connected end-to-end that extends into the wellbore from the surface of the formation. When weight is applied to the drill string and consequently to the drill bit, the rotating bit engages the formation and proceeds to form a wellbore. The weight used to push the drill bit into and against the formation is often referred to as the "weight-on-bit" (WOB). As the drill bit rotates, the cutters or abrasive structures thereof cut, crush, shear, and/or abrade away the formation material to form the wellbore. A diameter of the wellbore formed by the drill bit may be defined by the cutting structures disposed at the largest outer diameter of the drill bit.

Figure 1:
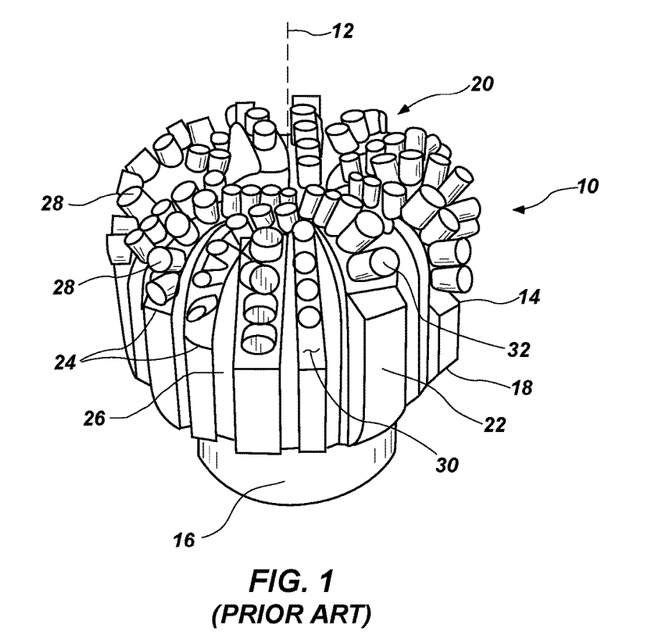
FIG. 1 is a perspective view of a conventional impregnated drag bit.

Different types of bits work more efficiently against formations with different physical properties. For example, so-called "impregnated" drag bits are used conventionally for drilling hard and/or abrasive rock formations, such as sandstones. Such conventional impregnated drill bits typically employ a cutting face comprising superabrasive cutting particles, such as natural or synthetic diamond grit, dispersed within and metallurgically and mechanically bonded to a matrix of wear-resistant material. As such a bit drills, the matrix and embedded diamond particles wear, cutting particles are lost as the matrix wears and new cutting particles are exposed. FIG. 1 is a perspective view of such a conventional impregnated drill bit 10 as known in the art. For clarity, the bit 10 is inverted from its normal face-down orientation during operation of the bit 10 while forming a wellbore in an earth formation. The bit 10 may have a longitudinal axis 12 representing a vertical axis, conventionally the centerline of a bit body 14, about which the bit 10 rotates in operation. The bit body 14 may comprise a shank 16 for connection to a drill string. The shank 16 may be coupled to a crown 18 of the bit 10. In some embodiments, the crown 18 may comprise a particulate-impregnated matrix material, which refers to a matrix material having abrasive particles or material including, but not limiting to, natural or synthetic diamond grit dispersed therein. The crown 18 may comprise a bit face surface 20 extending from the longitudinal axis 12 to a gage 22. A plurality of blades 24 may extend generally radially outwardly across the bit face surface 20. A plurality of fluid channels 26 may extend between and recessed from the blades 24. A plurality of nozzle ports for communicating drill fluid from an interior of the bit body 14 to the bit face surface 20 may be provided in one or more of the fluid channels 26. The plurality of blades 24 may comprise a plurality of discrete, post-like cutting structures 28 thereon.

The cutting structures 28 are mounted to or formed on the blades 24 such that at least a portion of the cutting structure 28 extends over the bit face surface 20. In other words, the cutting structures 28 are formed to at least partially extend over an outer surface 30 of the blades 24 such that the cutting structures 28 engage and cut formation material upon initial cutting action of the bit 10. Additionally, the cutting structures 28 are separated from each other to promote the flow of drilling fluid therearound for enhanced cooling and clearing of formation material.

As illustrated in FIG. 1, the cutting structures 28 comprise cylindrical posts having a generally round or circular transverse cross-section and having a substantially flat, outermost end 32 as disclosed, for example, in U.S. Pat. No. 6,510,906, entitled "Impregnated Bit with PDC Cutters in Cone Area," issued Jan. 28, 2003. Alternatively, as known in the art, the cutting structure 28 may comprise other post-like structures having a variety of transverse cross-sections and outermost end shapes. For example, the cutting structures 28 may have a transverse cross-section that increases or tapers in cross-sectional area as the cutting structure is worn down, as disclosed in U.S. Pat. No. 9,243,458, entitled "Methods for Pre-sharpening Impregnated Cutting Structures for Bits, Resulting Cutting Structures and Drill Bits So Equipped," issued Jan. 26, 2016. The outermost end 32 of the cutting structures 28 may be non-planar or arcuate having, for example, a saddle-shaped end as disclosed in U.S. Patent Pub. 2012/0080240, entitled "Diamond Impregnated Cutting Structures, Earth-boring Drill Bits and Other Tools Including Diamond Impregnated Cutting Structures, and Related Methods," filed Oct. 5, 2011, now U.S. Pat. No. 9,567,807, issued Feb. 14, 2017.

Figure 2:
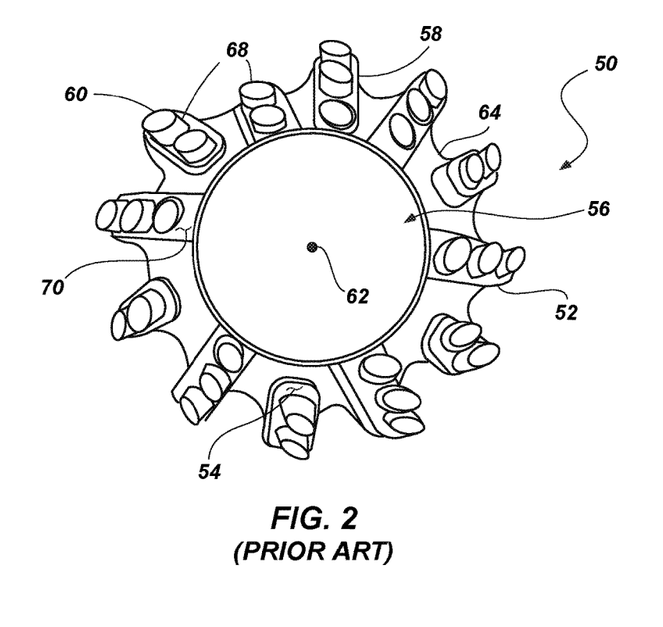
FIG. 2 is a top view of a conventional coring tool.

FIG. 2 illustrates a bottom view of an exemplary embodiment of a conventional coring bit 50. The bit 50 includes a bit body 52 having a bit face surface 54. A central opening, or throat 56, extends into the bit body 52 and is adapted to receive a core (not shown) being cut. A plurality of blades 58 may be disposed on the face surface 54 and may extend radially outward toward a gage 60 of the bit body 52 from a longitudinal axis 62 of the bit 50. The longitudinal axis 62 extends into the page in the bottom view of FIG. 2 and represents a vertical axis, conventionally the centerline of the bit body 52, about which the coring bit 50 rotates in operation. A plurality of fluid channels 64 extend radially between and recessed from the blades 58. A plurality of cutting structures 68 are attached to the blades 58.

In operation, the coring bit 50 is rotated about the longitudinal axis 62 and is used to cut a cylindrical core from the earth formation and to transport the core to the surface for analysis. The cutting structures 68 extend at least partially over an outer surface 70 of the blades 58 such that, upon initial cutting action of the coring bit 50, the cutting structures 68 engage and cut formation material. The cutting structures 68, like the cutting structures 28 of FIG. 1, comprise cylindrical posts as disclosed in U.S. Pat. No.

7,730,976, entitled "Impregnated Rotary Drag Bit and Related Methods," issued Jun. 8, 2010. The core of formation material cut by the bit 50 and the cutting structures 68 is received in the throat 56 and transported to the surface.

BRIEF SUMMARY

In some embodiments of the present disclosure, a tool for drilling subterranean formations includes a tool body having a face surface. The tool further includes a blade extending radially outward on the face surface toward a gage surface. The blade has an outer surface to engage and cut formation material. The tool also includes a plurality of cutting structures disposed in the blade. Each cutting structure of the plurality of cutting structures comprises a substantially spherical body of particulate impregnated matrix material.

In other embodiments of the present disclosure, a method of forming a tool for drilling a subterranean formation comprises disposing a plurality of cutting structures within a mold, disposing a matrix material within interstitial spaces between the plurality of cutting structures within the mold, and forming a tool body comprising the matrix material having the plurality of cutting structures dispersed therein. The plurality of cutting structures has a spherical body comprising a particulate impregnated matrix material.

In yet other embodiments of the present disclosure, a method of using an earth-boring tool for forming a wellbore in an earth formation includes disposing an earth-boring tool for forming a wellbore in an earth formation. The earth-boring tool comprises at least one spherical cutting structure recessed below an outer surface of a blade of the earth-boring tool. The method further includes rotating the earth-boring tool within the wellbore and cutting a formation material of the earth formation with the outer surface of the blade and wearing the outer surface of the blade to expose the at least one spherical cutting structure. After wearing the outer surface of the blade, the at least one spherical cutting structure engages the earth formation.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments of the disclosure when read in conjunction with the accompanying drawings, in which:

DETAILED DESCRIPTION

The illustrations presented herein are not meant to be actual views of any particular cutting structure, drill bit, or component thereof, but are merely idealized representations that are employed to describe embodiments of the present disclosure.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" in reference to a given parameter is inclusive of the stated value and has the meaning dictated by the context (e.g., it includes the degree of error associated with measurement of the given parameter).

As used herein, the term "and/or" includes any and all combinations of one or more of the associated listed items.

As used herein, the term "earth-boring tool" means and includes any tool used to remove formation material and to form a bore (e.g., a wellbore) through an earth formation by way of the removal of the formation material. Earth-boring tools include, for example, rotary drill bits (e.g., fixed-cutter or "drag" bits and roller cone or "rock" bits), hybrid bits including both fixed cutters and roller elements, coring bits, percussion bits, bi-center bits, reamers (including expandable reamers and fixed-wing reamers), and other so-called "hole-opening" tools.

Figure 3:
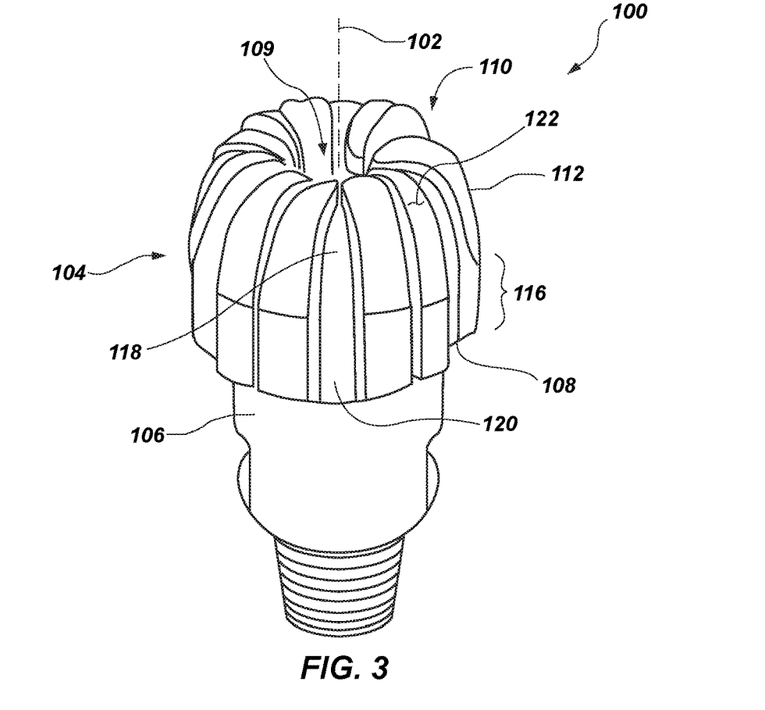
FIG. 3 is a perspective view of a drag bit according to embodiments of the present disclosure.
Figure 4:
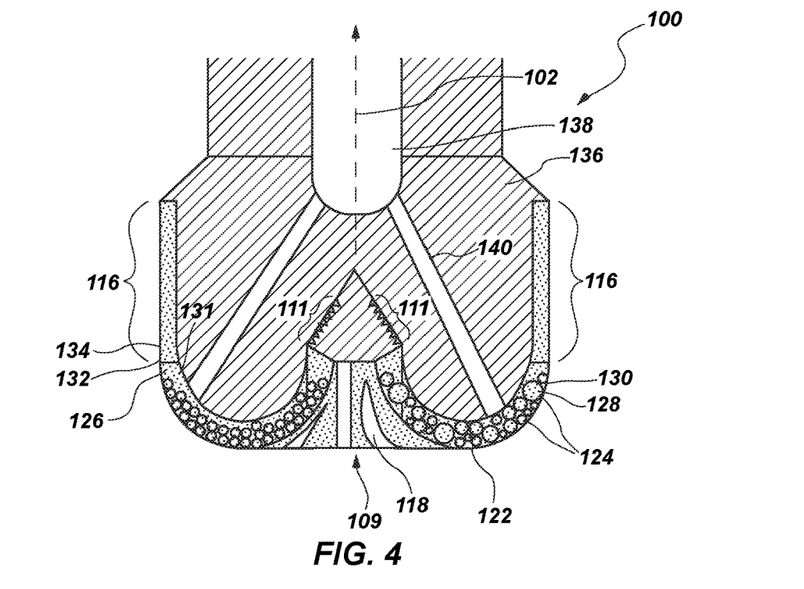
FIG. 4 is a cross-sectional view of the drag bit of FIG. 3.

FIG. 3 is a perspective view of a drag bit 100 in accordance with embodiments of the present disclosure. For clarity, the bit 100 is inverted from its normal face-down orientation during operation of the bit 100 while forming a wellbore in an earth formation. The bit 100 may have a longitudinal axis 102 representing a vertical axis, conventionally the centerline of a bit body 104, about which the bit 100 rotates in operation. The bit body 104 may comprise a shank 106 for connection to a drill string (not shown). The shank 106 may be coupled to a crown 108 of the bit 100. In some embodiments, the crown 108 may comprise a particulate impregnated matrix material. In other embodiments, the crown 108 may comprise a metal matrix material. The crown 108 may comprise a bit face surface 110 extending from the longitudinal axis 102 to a gage 116.

The crown 108 may comprise a plurality of blades 112 circumferentially spaced about the longitudinal axis 102 and extending generally radially outward toward the gage 116. In some embodiments, the blades 112 may extend generally linearly outward. In other embodiments, the blades 112 may extend in a generally helical manner outward. The plurality of blades 112 may also extend axially along at least a portion of the gage 116. The gage 116 may comprise a radially outermost surface of the bit 100 surrounding the bit face surface 110 for engaging a sidewall of the wellbore. The crown 108 may also include a plurality of fluid channels 118 located between and recessed from the blades 112 and extending within the bit face surface 110 and to junk slots 120 in the gage 116. A plurality of fluid ports may be located in the bit face surface 110 and, more particularly, within the fluid channels 118 to promote the flow of drilling fluid for cooling and clearing of formation material from the bit face surface 110. The crown 108 may include an inverted cone region 109 within a central region of the bit face surface 110 proximate to the longitudinal axis 102. The inverted cone region 109 extends radially inward and within the bit face surface 110 and away from the earth formation when the bit 100 is inverted in operation. In some embodiments, the inverted cone region 109 may include a cone region displacement 111 (FIG. 4) on which cutting elements may be mounted in a helical or spiral manner as disclosed in U.S. Pat. No. 7,617,747, entitled "Methods of Manufacturing Rotary Drag Bits Including a Central Region Having a Plurality of Cutting Structures," issued Nov. 17, 2009, which is incorporated herein by this reference.

FIG. 4 is a schematic, cross-sectional view of a portion of the crown 108 of the bit 100 of FIG. 3. The cutting structures 124 may be dispersed within a material 126 of the blades 112. The material 126 of the blades 112 may be an impregnated matrix material, which refers to a matrix material having superabrasive particles or material including, but not limited to, natural or synthetic diamond grit dispersed therein. In some embodiments, the material 126 of the blades 112 may comprise a plurality of abrasive particles 132 including dispersed in a matrix of wear resistant material 134. The abrasive particles 132 may include a mixture of diamond particles and hard particles, such as particles of tungsten carbide. In some embodiments, the abrasive particles 132 disposed in the wear resistant material 134 may vary in size depending on the abrasive nature of the formation material in which the bit 100 may be disposed. The mesh sizes of the abrasive particles 132 may extend in a range from mesh sizes about 30/40 (660 stones per carat (SPC)) to about 15/20 (150 SPC). By way of example and not limitation, relatively small particles may be advantageous for bits 100 disposed in hard and abrasive earth formation, and relatively large particles may be advantageous for bits 100 disposed in soft and non-abrasive earth formations. The matrix material 134 may comprise metal matrix material, such as a copper-based alloy. A core 136 of the bit 100 may include an internal cavity 138 and fluid courses 140 in fluid communication with fluid ports in the bit face surface 110 providing the flow of drilling fluid therethrough. The core 136 of the bit 100 may comprise a metal or metal alloy such as iron, steel, titanium, titanium alloys, nickel, nickel alloys, and other materials known in the art as useful in fabricating earth-boring tools.

The cutting structures 124 may comprise a plurality of superabrasive particles 128 dispersed within a matrix material 130. In some embodiments, the superabrasive particles 128 may be substantially uniformly distributed within the cutting structures 124 and within the material 126 thereof. For example, the superabrasive particles 128 may comprise pelletized diamond grit. The pelletized diamond grit may include diamond particles having a coating of a matrix forming material thereon, such as a metallic material. In some embodiments, the pelletized diamond grit may be disposed in a mold such that upon heating with or without the application of pressure, the coating of the pelletized diamond grit melts to form a matrix phase in which the diamond particles are substantially evenly or uniformly distributed. In other embodiments, the pelletized diamond grit may comprise coated diamond particles as described in U.S. Pat. No. 7,810,588, entitled "Multi-Layer Encapsulation of Diamond Grit for Use in Earth-Boring Bits, issued Oct. 12, 2010, or as described in U.S. Pat. No. 8,225,890, entitled "Impregnated Bit with Increased Binder Percentage," issued on Jul. 24, 2012, the disclosure of each of which is incorporated herein its entirety by this reference. In yet other embodiments, the superabrasive particles 128 may include synthetic diamond grit, natural diamond grit, cubic boron nitride, etc. The matrix material 130 may comprise a metal or metal alloy such as a copper-based alloy, an iron-based alloy, a nickel-based alloy, a cobalt-based alloy, an aluminum-based alloy, a titanium-based alloy, mixtures of such alloys, etc. The cutting structures 124 may be formed by providing a particle mixture of the matrix material 130 and the superabrasive particles 128 into a die or mold. The mixture may be pressed to form a green body in a hot pressing or cold pressing process. The green body may be subject to a sintering process with or without the application of pressure to form the cutting structure 124.

In some embodiments, one or more of the superabrasive particles 128, 132 may comprise a synthetic diamond grit, such as, for example, synthetic diamond grit, commercially available from DeBeers of Shannon, Ireland, which has demonstrated toughness superior to natural diamond grit. The hard particles of the blade material 126 may comprise a carbide-based material. For example, the hard particles of the blade material 126 may include a fine grain carbide (e.g., tungsten carbide), such as, for example, DM2001 powder commercially available from Kennametal Inc., of Latrobe, Pa. Such a carbide powder, when infiltrated with a metal or metal alloy material, provides increased exposure of the diamond grit particles in comparison to conventional matrix materials due to its relatively soft, abradable nature. A base 131 of each blade 112 may desirably be formed of, for example, a more durable tungsten carbide powder matrix material, obtained from Firth MPD of Houston, Tex. Use of the more durable material in this region helps to prevent ring-out even if all of the discrete cutting structures 124 are abraded away and the majority of each blade 112 is worn.

The cutting structures 124 may be formed as individual, or discrete, structures. In some embodiments, the cutting structures 124 may be formed as substantially round structures. For example, the cutting structures 124 may have a substantially spherical or ovoid shaped body. The cutting structures 124 may have a diameter extending in a range from about 0.25 inch to about 1.0 inch. By way of example and not limitation, the cutting structures 124 may have a diameter of about 0.25 inch, about 0.375 inch, about 0.5 inch, about 0.675 inch, about 0.85 inch, and/or about 1.0 inch.

By way of example and not limitation, the size distribution of the cutting structures 124 within the blades 112 may be varied based on properties of the formation material being cut by the tool. In some embodiments, each blade 112 of the plurality may comprise a plurality of uniformly sized cutting structures 124. In other words, the cutting structures 124 may have a substantially mono-modal size distribution. Drag bits 100 comprising uniformly sized cutting structures 124 may provide superior performance in hard and abrasive formations. In other embodiments, each blade 112 of the plurality may comprise a plurality of different sized cutting structures 124. In other embodiments, the cutting structures 124 may have a multi-modal (e.g., bi-modal, tri-modal, etc.) size distribution. Drag bits 100 comprising a plurality of different sized cutting structures 124 disposed therein may provide superior performance for drilling soft and less abrasive formations. In yet other embodiments, at least one blade 112 of the plurality may comprise a plurality of uniformly sized cutting structures 124 and at least one other blade 112 of the plurality may comprise a plurality of randomly sized cutting structures 124. As earth-boring tools may encounter interbedded formations having a mixture of relatively soft and hard formation materials, it may be advantageous to provide an earth-boring tool having cutting structures 124 that provide superior performance in each of these formation materials.

As illustrated in the cross-sectional view of FIG. 4, the bit 100 may comprise a plurality of cutting structures 124 recessed from an outer surface 122 of the blades 112. Unlike the conventional bit 10 and as illustrated in FIG. 3, the bit 100 may lack cutting structures 124 that extend over the bit face surface 110 of the bit 100. In other words, the outer surface 122 of the blades 112 may engage and cut formation material upon initial cutting action of the bit 100. The cutting structures 124 may be recessed such that upon initial cutting action of the bit 100, the cutting structures 124 do not engage or cut formation material. The cutting structures 124 may engage and cut formation material only after the outer surface 122 of the blades 112 has at least partially worn away.

In some embodiments, unlike the conventional cutting structures 28 of the bit 10, which are separated by some distance on the blades 24 (FIG. 1), the cutting structures 124 may be dispersed within the matrix material 134 of the blade 112 such that one cutting structure 124 may be in contact with at least one other cutting structure 124.

In operation, the bit 100 may be disposed in an earth formation to form a wellbore therein. The bit 100 may be run into a wellbore and "broken-in" or "sharpened" by drilling into an earth formation at a selected weight-on-bit (WOB) as the bit 100 is rotated about the longitudinal axis 102. In the initial stages of penetration of the earth formation, the bit 100 may be run into the wellbore at an increased rate of penetration (ROP) to wear away the matrix material 134 of the blades 112 and expose the abrasive particles 132 that may be disposed therein. The bit 100 may be "sharpened" when the abrasive particles 132 are exposed and may engage the formation material. More particularly, the blades 112 may serve as cutting structures that engage formation material with the outer surface 122 thereof. The blades 112 may be "sharpened" when the outer surface 122 at least partially wears away such that at least a portion of the cutting structures 124 disposed therein may be exposed to engage formation material. As the bit 100 and blades 112 continue to engage formation material, the cutting structures 124 and the abrasive particles 132 become worn.

In some embodiments, the cutting structures 124 and, more particularly, the matrix material 130 of the cutting structures 124 wear at a slower rate than the blade material 126 and, more particularly, the matrix material 134 of the blades 112. In other words, the matrix material 130 of the cutting structures 124 may be more wear resistant that the matrix material 134 of the blades 112.

As the cutting structures 124 wear, the superabrasive particles 128 may be lost (e.g. shed) from the matrix material 130 of the cutting structures 124 and unworn superabrasive particles 128 may be exposed to engage and cut formation material. Also as the cutting structures 124 wear, new, unworn cutting structures 124 may be exposed and engage formation material. Abrasive particles 132 may also be lost from the matrix material 134 of the blades 112 and unworn cutting structures 124 may be exposed to engage and cut formation material. Jets or streams of drilling fluid from nozzle ports may be provided on the bit face surface 110 to clean and cool the cutting structures 124 and to clean away formation cuttings, worn abrasive particles 128, 132, worn cutting structures 124, and/or other debris from between the blades 112.

Figures 5, 6:
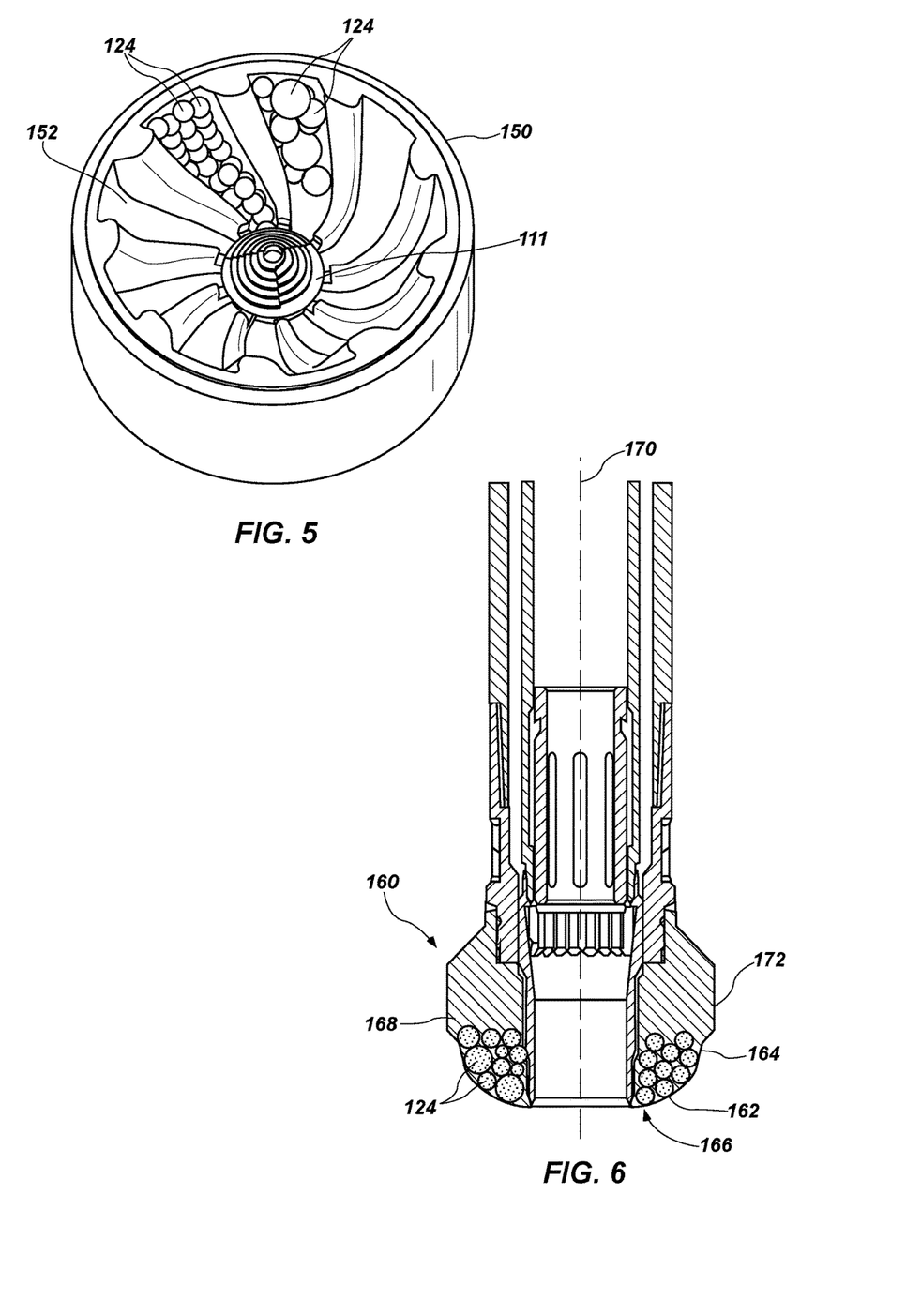
FIG. 5 is a perspective view of a plurality of cutting structures according to embodiments of the present disclosure disposed in a mold.
FIG. 6 is a cross-sectional view of a coring tool according to embodiments of the present disclosure.

Embodiments of the present disclosure further include methods of forming earth-boring tools. The bit 100 may be formed at least in part by a molding process. In such embodiments, a mold 150 having a shape that is complementary to a shape of the desired tool body geometry may be provided, as illustrated in FIG. 5. In some embodiments, the mold 150 may be formed (e.g., by machining and/or hand forming processes) to have a plurality of cavities 152 for forming blades of an earth-boring tool therein, such as the blades 112 of the impregnated bit 100.

The cutting structures 124 may be formed as an integral part of the blades 112. It is also noted that, while discussed in terms of being integrally formed with the blades 112, the cutting structures 124 may be formed as discrete individual segments prior to being disposed in the mold cavities 152, as previously described herein. In some embodiments, the cutting structures 124 may be disposed in at least one mold cavity 152. At least one layer of cutting structures 124 may be provided in the mold cavity 152. In other embodiments, the cutting structures 124 may be densely packed in the mold cavity 152 such that the cutting structures 124 substantially fill the mold cavity 152. For example, the cutting structures 124 may occupy a majority of the volume of the mold cavity 152. In other embodiments, the cutting structures 124 may comprise at least 70%, at least 80%, or at least 90% by volume of the mold cavity 152. Also, as previously discussed with regard to FIG. 4, each mold cavity 152 may be filled with either a plurality of uniformly sized cutting structures 124 or a plurality of differently sized cutting structures 124. The mold cavity 152 may form a portion of the blades 112 extending over the fluid channels 118 along the bit face surface 110. Thus, this portion of the blades 112, which may wear as a result of engagement with the formation material, may comprise at least 70%, at least 80%, or at least 90% by volume of the cutting structures 124 with a remainder of the volume occupied by the blade material 126.

The material 126 of the blades 112 may also be disposed in mold cavity 152. In some embodiments, the abrasive particles 132 of the material 126 may be hand-packed into the mold cavities 152. The material 126 may substantially fill the interstitial spaces between adjacent cutting structures 124 and may occupy the remaining volume of the blades 112. In other embodiments, the mold cavities 152 may further include blanks or inserts for forming other structures, such as nozzle ports, of the bit 100. The abrasive particles 132 are then infiltrated with the matrix material 134. After infiltration, the molten metal matrix material 134 may be allowed to cool and solidify. As a result, the abrasive particles 132 and the cutting structures 124 may be embedded within a continuous phase of the matrix material 134. The resulting impregnated bit 100 may then be removed from the mold 150. In other embodiments, the abrasive particles 132 of the material 126 and particles (e.g., powder) of the matrix material 134 may be hand-packed into the mold cavities 152 about the cutting structures 124, and the particles 132 and matrix material 134 particles may be pressed and sintered in a hot isostatic pressing (HIP) process to embed the abrasive particles 132 and cutting structures 124 within a continuous phase of the matrix material 134.

Embodiments of the present disclosure also include coring tools including cutting structures 124 as previously disclosed herein. FIG. 6 illustrates a cross-sectional view of another earth-boring tool, including a coring bit 160, according to embodiments of the present disclosure. Unlike the exemplary conventional coring bit 50 of FIG. 2, the coring bit 160 may lack a plurality of cutting elements on an outer surface 162 of a blade 164 on a bit face surface 166 of the coring bit 160. As previously described with reference to FIGS. 3 and 4 and as illustrated in the cross-sectional view of the bit 160 in FIG. 6, the coring bit 160 may comprise a plurality of cutting structures 124 recessed below the outer surface 162 such that, upon initial cutting action of the coring bit 160, the cutting structures 124 do not engage or cut formation material. The cutting structures 124 may engage and cut formation material only after the outer surface 162 of the blades 164 has at least partially worn away. The coring bit 160 may also be formed by the methods previously discussed with reference to FIG. 5.

Like the drag bit 100, the cutting structures 124 may be disposed within a matrix material 168 of the coring bit 160. In some embodiments, the matrix material 168 may comprise a particulate impregnated matrix material, as previously described with regard to the material 126 of the blades 112 of the drag bit 100. In other embodiments, the bit 160 may comprise a metal matrix material. Also as previously discussed regarding the drag bit 100, the blades 164 of the coring bit 160 may be filled with either a plurality of uniformly sized cutting structures 124 or a plurality of differently sized cutting structures 124.

As previously stated, in operation, the coring bit 160 may be rotated about a longitudinal axis 170 and may cut a cylindrical core from the earth formation and transport the core to the surface for analysis. The outer surface 162 of the blades 164 may engage and cut the formation material such that a matrix material 168 of a coring bit body 172 and, more particularly, of the blades 164 wears away to expose abrasive particles that may be disposed therein. The outer surface 162 of the blades 164 may also at least partially wear away to expose at least a portion of the cutting structures 124 disposed therein to engage and cut formation material. As the bit 160 and blades 164 continue to engage and cut formation material, the cutting structures 124 and the abrasive particles of the matrix material 168 become worn. The worn cutting structures 124 may be lost (e.g., shed) from the matrix material 168 of the bit body 172 and unworn cutting structures 124 may be exposed to engage and cut formation material. Similarly, worn abrasive particles of the matrix material 168 of the bit body 172 may be lost and unworn abrasive particles may be exposed to engage and cut formation material. Jets or streams of drilling fluid may be provided to clean and cool the cutting structures 124 and to clean away formation cuttings, worn abrasive materials, and other debris from between the blades 164.

While the disclosed structures and methods are susceptible to various modifications and alternative forms in implementation thereof, specific embodiments have been shown by way of example in the drawings and have been described in detail herein. However, it should be understood that the present disclosure is not limited to the particular forms disclosed. Rather, the present invention encompasses all modifications, combinations, equivalents, variations, and alternatives falling within the scope of the present disclosure as defined by the following appended claims and their legal equivalents.

What is claimed is:

1. A tool for drilling subterranean formations, comprising:
a tool body having a face surface;
a blade extending radially outward on the face surface toward a gage surface, the blade having an outer surface to engage and cut formation material; and
a plurality of cutting structures disposed in the blade, each cutting structure of the plurality of cutting structures comprising a substantially spherical body of particulate impregnated matrix material, wherein cutting structures of the plurality of cutting structures have a diameter extending in a range from about 0.25 inch to about 1.0 inch.

2. The tool of claim 1, wherein the plurality of cutting structures is recessed from the outer surface of the blade such that, upon an initial cutting action of the tool with the outer surface of the blade, the plurality of cutting structures does not engage or cut formation material, and such that the plurality of cutting structures engages and cuts formation material only after the outer surface of the blade has worn at least partially away.

3. The tool of claim 1, wherein the plurality of cutting structures has a substantially uniform size distribution.

4. The tool of claim 1, wherein the plurality of cutting structures has multi-modal size distribution.

5. The tool of claim 1, wherein the tool comprises a plurality of blades, and wherein a first blade of the plurality of blades comprises cutting structures having a mono-modal size distribution and a second blade of the plurality of blades comprises cutting structures having a multi-modal size distribution.

6. The tool of claim 1, wherein the plurality of cutting structures occupies at least 80 percent by volume of the blade.

7. The tool of claim 1, wherein the tool body comprises a drag bit body.

8. The tool of claim 1, wherein the tool body comprises a coring bit body.

9. The tool of claim 1, wherein the blade comprises a plurality of abrasive particles disposed in a wear resistant matrix material.

10. A method of forming a tool for drilling a subterranean formation, comprising:
disposing a plurality of cutting structures within a mold, wherein the plurality of cutting structures comprise at least 70 percent by volume of a blade portion of a cavity defined by the mold, the plurality of cutting structures having spherical bodies and comprising a plurality of superabrasive particles dispersed in a material;
disposing another material different from the material of the plurality of cutting structures within interstitial spaces between the plurality of cutting structures within the mold; and
forming a tool body comprising the another material having the plurality of cutting structures dispersed therein, the spherical bodies configured such that the superabrasive particles become exposed and contact the subterranean formation to remove material from the subterranean formation during use of the tool.

11. The method of claim 10, wherein forming the tool body comprises recessing the plurality of cutting structures from an outer surface of the tool body such that, upon initial cutting action of the tool with the outer surface of the tool body, the plurality of cutting structures does not engage or cut formation material, and such that the plurality of cutting structures engages and cuts formation material only after the outer surface of the tool body has worn at least partially away.

12. The method of claim 10, wherein forming the tool body comprises forming a tool body having at least one blade.

13. The method of claim 12, further comprising selecting the plurality of cutting structures to occupy at least 80 percent by volume of the at least one blade.

14. The method of claim 10, further comprising selecting the plurality of cutting structures to have a multi-modal size distribution.

15. The method of claim 10, further comprising selecting the plurality of cutting structures to have a mono-modal size distribution.

16. The method of claim 10, wherein forming the tool body comprises forming a coring bit body.

17. The method of claim 10, wherein forming the tool body comprises forming a drag bit body.

18. The method of claim 10, wherein the blade portion of the cavity defined by the mold has a shape complementary to a shape of a blade of the tool body.

19. A method of using an earth-boring tool for forming a wellbore in an earth formation, the method comprising:
- disposing an earth-boring tool for forming a wellbore in an earth formation, the earth-boring tool comprising at least one spherical cutting structure recessed below an outer surface of a blade of the earth-boring tool and dispersed in a material of the blade, wherein the at least one spherical cutting structure comprises at least 70 percent by volume of the blade, the at least one spherical cutting structure comprising a plurality of superabrasive particles dispersed in another material different from the material of the blade;
- rotating the earth-boring tool within the wellbore and cutting a formation material of the earth formation with the outer surface of the blade and wearing the outer surface of the blade to expose the at least one spherical cutting structure; and
- after wearing the outer surface of the blade, engaging the earth formation with the at least one spherical cutting structure and causing the superabrasive particles therein to contact and cut away the formation material.

20. The tool of claim 10, wherein the superabrasive particles are chosen from diamond, natural diamond, or cubic boron nitride.

* * * * *